(12) United States Patent
Axnäs et al.

(10) Patent No.: US 10,361,747 B2
(45) Date of Patent: Jul. 23, 2019

(54) HOPPING SYNCHRONIZATION SIGNALS

(71) Applicant: Telefonaktiebolaget LM Ericsson (publ), Stockholm (SE)

(72) Inventors: Johan Axnäs, Solna (SE); Kumar Balachandran, Pleasanton, CA (US); Dennis Hui, Sunnyvale, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 130 days.

(21) Appl. No.: 15/519,594

(22) PCT Filed: Oct. 24, 2014

(86) PCT No.: PCT/SE2014/051253
§ 371 (c)(1),
(2) Date: Apr. 17, 2017

(87) PCT Pub. No.: WO2016/064315
PCT Pub. Date: Apr. 28, 2016

(65) Prior Publication Data
US 2017/0257139 A1    Sep. 7, 2017

(51) Int. Cl.
*H04J 3/06* (2006.01)
*H04B 1/7156* (2011.01)
*H04L 5/00* (2006.01)
*H04W 56/00* (2009.01)
*H04W 84/04* (2009.01)

(52) U.S. Cl.
CPC ......... *H04B 1/7156* (2013.01); *H04L 5/0007* (2013.01); *H04L 5/0012* (2013.01); *H04L 5/0048* (2013.01); *H04W 56/0015* (2013.01); *H04L 5/0023* (2013.01); *H04L 5/0082* (2013.01); *H04W 84/042* (2013.01)

(58) Field of Classification Search
CPC ... H04L 5/0007; H04L 5/0012; H04L 5/0048; H04W 56/0015; H04B 1/7156
USPC .................. 370/503–520, 350; 375/132–138
See application file for complete search history.

(56) References Cited

U.S. PATENT DOCUMENTS

| | | | | |
|---|---|---|---|---|
| 4,004,100 A | * | 1/1977 | Takimoto | H04J 3/0611 370/509 |
| 4,752,939 A | * | 6/1988 | Amoroso | H04B 1/713 375/134 |

(Continued)

OTHER PUBLICATIONS

"Synchronization Signal Design for OFDM Based on Time-Frequency Hopping Patterns" by: Jiann-Ching Guey, Proceedings of the 2007 IEEE International Conference on Communications (ICC 2007), Jun. 24-28, 2007, Glasgow, UK, IEEE, Piscataway, NJ, USA, Jun. 1, 2007 (Jun. 1, 2007), pp. 4329-4334.

(Continued)

*Primary Examiner* — Thai D Hoang
(74) *Attorney, Agent, or Firm* — Patent Portfolio Builders, PLLC

(57) ABSTRACT

A method of synchronizing transmission of signals from a network node to a receiver includes generating a synchronization signal transmission pattern in which transmission resources used for transmission of the synchronization signals in regularly spaced time intervals are changed in successive ones of the time intervals, and transmitting synchronization signals from the network node in accordance with the synchronization signal transmission pattern. Related network nodes and user equipment nodes are disclosed.

20 Claims, 10 Drawing Sheets

(56) References Cited

U.S. PATENT DOCUMENTS

| | | | | |
|---|---|---|---|---|
| 5,361,398 A * | 11/1994 | Christian | ............... | H04H 20/67 375/356 |
| 6,826,245 B1 * | 11/2004 | Brown | ...................... | H04L 7/08 375/368 |
| 7,711,029 B2 | 5/2010 | Guey | | |
| 2005/0265198 A1 * | 12/2005 | Yen | ........................ | G11B 20/10 369/59.19 |
| 2006/0067444 A1 * | 3/2006 | Hamamoto | ........... | H04L 1/0054 375/347 |
| 2006/0193415 A1 * | 8/2006 | Kim | ........................ | H04L 7/042 375/368 |
| 2008/0062829 A1 * | 3/2008 | Yang | .................. | G11B 7/00736 369/47.1 |
| 2009/0141836 A1 * | 6/2009 | Shirakata | ............ | H04L 27/2662 375/343 |
| 2010/0135257 A1 * | 6/2010 | Higuchi | ............... | H04J 11/0076 370/336 |
| 2011/0038398 A1 | 2/2011 | Konno | | |
| 2011/0176464 A1 * | 7/2011 | Warner | .................. | H04B 1/713 370/311 |
| 2015/0341775 A1 * | 11/2015 | Tiirola | .................. | H04W 8/005 370/254 |
| 2018/0287867 A1 * | 10/2018 | Yao | ..................... | H04L 41/0806 |

OTHER PUBLICATIONS

"Harmonized Proposal on DRCH/BRCH Multiplexing and FFR," 3GPP2 Draft; C30-20070108-038R2 LNQS-DRCH BRCH Multiplexing and FFR, 3rd Generation Partnership Project 2, 3GPP2, 2500 Wilson Boulevard, Suite 300, Arlington, Virginia 22201; USA; Jan. 12, 2007 (Jan. 12, 2007), pp. 1-20.

Office Action in application No. 14799902.3 dated Apr. 11, 2018; 7 pages.

* cited by examiner

HOPPING SYNCHRONIZATION SIGNALS

CROSS REFERENCE TO RELATED APPLICATION

This application is a 35 U.S.C. § 371 national stage application of PCT International Application No. PCT/SE2014/051253, filed on 24 Oct. 2014, the disclosure and content of which are incorporated by reference herein in their entirety.

TECHNICAL FIELD

The present application relates to wireless communications systems, and more particularly, to wireless communication systems that use synchronization signals to synchronize nodes.

BACKGROUND

In order for two nodes in a radio communication system to establish a connection with each other, they need to be synchronized (aligned) in time and frequency. Such synchronization is typically achieved by having one of the nodes, e.g. an access node (AN), transmit synchronization pilot symbols, or pilots, which comprise a set of predefined signals on predefined radio resources. For example, the pilots may be transmitted on predetermined frequencies at regular time intervals. The other node, which may, for example be a user equipment (UE) node, may detect and use these signals as a reference to which it can aligns its own frequency reference and timing (clock). A "radio resource" may include a physical or logical resource that can be used to transmit information. A "radio resource" can include, for example, a frequency band in a frequency division multiplexing communication system, a time slot in a time division multiplexing communication system, a subcarrier of a symbol in an orthogonal frequency division multiplexing (OFDM) communication system, a spreading code in a code division multiplexing communication system, an antenna beam, etc.

The 3GPP Long Term Evolution (LTE) specification defines a primary synchronization signal (PSS) that is transmitted in the center frequency portion of an OFDM symbol every 5 milliseconds. The PSS is mapped into the first 31 subcarriers on either side of the DC subcarrier. Therefore, the PSS uses six resource blocks with five reserved subcarriers on each side.

FIG. 1 is a schematic illustration of an OFDM radio frame showing the location of the PSS. In frequency division duplex (FDD) mode, the PSS is mapped to the last OFDM symbol in slots 0 and 10. In time division duplex (TDD) mode, the PSS is mapped to the third OFDM symbol in subframes 0 and 5, as shown in FIG. 1.

As shown in FIG. 1, a secondary synchronization signal (SSS) is also transmitted. The SSS is based on maximum length sequences (m-sequences), which are pseudorandom binary sequences. Three m-sequences, each of length 31, are used to generate the synchronization signals. The SSS is transmitted in the same subframe as the PSS but one OFDM symbol earlier. The SSS is mapped to the same subcarriers (middle 72 subcarriers) as the PSS. The PSS and SSS are defined in 3GPP TS 36.211. "Physical Channels and Modulation." 3rd Generation Partnership Project; Technical Specification Group Radio Access Network; Evolved Universal Terrestrial Radio Access (E-UTRA).

The division of the synchronization signal into PSS and SSS in the 3GPP LTE specification signals is designed to reduce the complexity of the cell search process.

In case of multi-antenna systems, the synchronization signals may additionally serve the purpose of finding suitable transmit and receive beam directions for communication between the two nodes. Different beam directions are then typically used for transmission on different pilot resources, allowing the other node to identify the best beam to use for transmission of signals.

SUMMARY

It is a general objective to transmit synchronization signals from a network node to user equipment nodes in a wireless communication network.

It is a particular objective to transmit synchronization signals from a network node to user equipment nodes in a wireless communication network in a manner that increases the probability that the synchronization signals will be successfully received by the user equipment nodes.

These and other objectives are met by embodiments as disclosed herein.

Some aspects of the inventive concepts provide a method of synchronizing transmission of signals from an access node to a receiver. The method includes generating a synchronization signal transmission pattern in which transmission resources used for transmission of the synchronization signals in regularly spaced time intervals are changed in successive ones of the time intervals, and transmitting synchronization signals from an access node in accordance with the synchronization signal transmission pattern.

The transmission resources may include frequency resources, time offsets relative to the regularly spaced time intervals, spreading codes, and/or beamforming patterns.

The synchronization signal transmission pattern may include a pseudorandom pattern and/or a nonrandom pattern. In some embodiments, the pseudorandom pattern repeats at regular intervals.

In some embodiments, the transmission resources may remain constant for a predetermined number of time intervals before changing.

Some aspects provide a network node including a processor circuit, a transceiver coupled to the processor circuit, and a memory device coupled to the processor circuit. The memory device includes a synchronization signal pattern generator that generates a synchronization signal transmission pattern in which transmission resources used for transmission of the synchronization signals in regularly spaced time intervals are changed in successive ones of the time intervals, and a synchronization signal generator that generates the synchronization signals in accordance with the synchronization signal transmission pattern, and the processor circuit causes the transceiver to transmit the synchronization signals in accordance with the synchronization signal transmission pattern.

Some aspects provide a user equipment node including a processor circuit, a transceiver coupled to the processor, and a memory device coupled to the processor. The memory device includes a synchronization signal pattern analyzer that analyzes synchronization signals received by the transceiver and identifies a transmission pattern of the synchronization signals in which transmission resources used for transmission of the synchronization signals in regularly spaced time intervals are changed in successive ones of the time intervals, and the processor circuit causes the transceiver to receive the synchronization signals in accordance with the transmission pattern of the synchronization signals.

Some further aspects provide a network node that interacts with a user equipment node. The network node includes a synchronization signal pattern generator module that generates a synchronization signal transmission pattern in which transmission resources used for transmission of the synchronization signals in regularly spaced time intervals are changed in successive ones of the time intervals, and a synchronization signal generator module that generates the synchronization signals in accordance with the synchronization signal transmission pattern. The network node transmits the synchronization signals in accordance with the synchronization signal transmission pattern.

Some further aspects provide a user equipment node that interacts with an access node. The user equipment node includes a processor circuit, a transceiver coupled to the processor circuit, and a memory device coupled to the processor circuit. The memory device includes a synchronization signal pattern analyzer that analyzes synchronization signals received by the transceiver and identifies a transmission pattern of the synchronization signals in which transmission resources used for transmission of the synchronization signals in regularly spaced time intervals are changed in successive ones of the time intervals, and the processor circuit causes the transceiver to receive the synchronization signals in accordance with the transmission pattern of the synchronization signals.

Some aspects provide a method of operating a user equipment node that interacts with a network node. The method includes analyzing synchronization signals received by the user equipment node, identifying a transmission pattern of the synchronization signals in which transmission resources used for transmission of the synchronization signals in regularly spaced time intervals are changed in successive ones of the time intervals, and receiving the synchronization signals in accordance with the transmission pattern of the synchronization signals.

Identifying the transmission pattern of the synchronization signals may include receiving a first synchronization signal, and generating a plurality of hypotheses of the synchronization signal pattern based on transmission resources used for transmission of the first synchronization signal.

Identifying the transmission pattern of the synchronization signals may further include receiving a second synchronization signal, and eliminating at least one hypothesis of the plurality of hypotheses of the synchronization signal pattern based on transmission resources used for transmission of the second synchronization signal.

The method may further include, after eliminating the at least one hypothesis of the synchronization signal pattern, determining if more than one hypothesis of the synchronization signal pattern remains, and if so, receiving another synchronization signal.

The method may further include, after eliminating the at least one hypothesis of the synchronization signal pattern, determining if more than one hypothesis of the synchronization signal pattern remains, and if only one hypothesis of the synchronization signal pattern remains, determining that the synchronization signal pattern corresponds to the remaining synchronizing pattern hypothesis, and synchronizing the user equipment node to the network node using the synchronization signal pattern.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
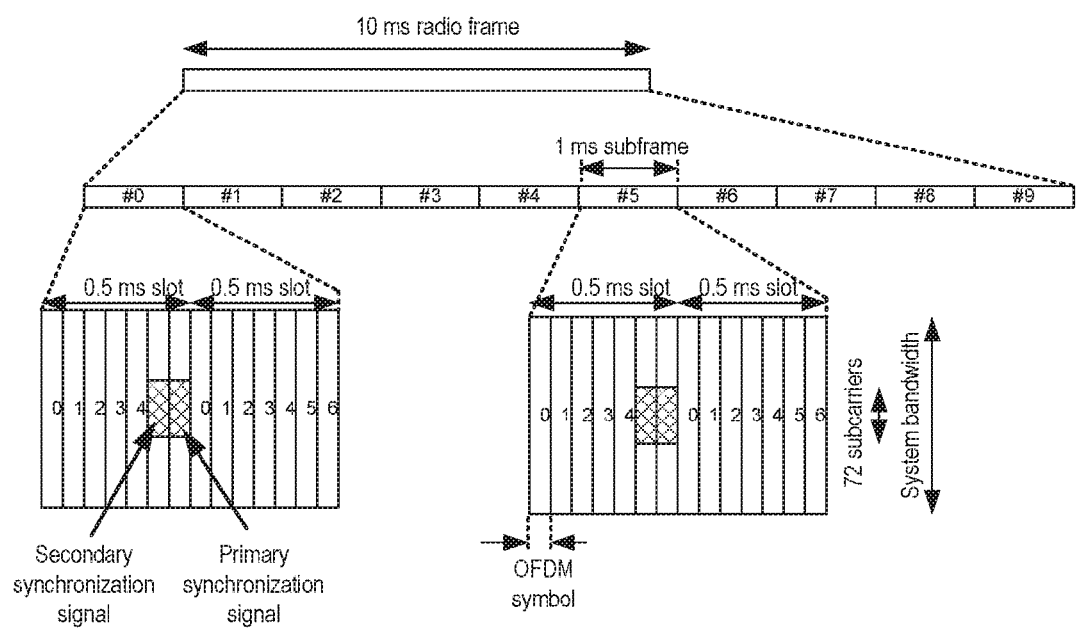
FIG. 1 is a schematic diagram illustrating primary and secondary synchronization signals in a 3G LTE communication system.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Some embodiments are based on the recognition that synchronization signals may be subjected to regular or intermittent interference from other radio transmissions. Some embodiments change the radio resources, such as time and/or frequency resources, used for the transmission of synchronization signals from one synchronization signal to the next in a predictable manner, so that the synchronization signals may be less affected by interference or environmental factors. That is, changing the radio resources used to transmit the synchronization signals may reduce the risk that all, or most, of the synchronization signals will be subject strongly interfered with by signals from another radio communication system. In some embodiments, the time/frequency resources used to transmit synchronization signals may be changed according to a pseudorandom sequence or according to a non-random sequence. For example, some embodiments may use of frequencies that are defined according to an arithmetic sequence.

A pseudorandom may be generated by a pseudorandom number generator, which is an algorithm for generating a sequence of numbers whose properties approximate the properties of sequences of random numbers. For example, a pseudorandom sequence may have an ideal autocorrelation function. The generated pseudorandom sequence is not truly random, because it is completely determined by a relatively small set of initial values, referred to as the seed of the pseudorandom number generator. Thus, if the pseudorandom number generator's generating function or algorithm is known along with the seed, the sequence of numbers generated by the pseudorandom number generator can be identically reconstructed.

Radio communication systems that operate in a license-free frequency band may be subjected to interference from other radio communication systems. This interference may potentially be quite strong, making it desirable to utilize, to the largest extent possible, radio resources that are unused by the interfering system (e.g., unused frequency and/or time intervals). However, if the type of the interfering system is unknown, there may be no way to know in advance where or when these gaps will occur. There is thus a non-negligible risk that all or most of the synchronization signals transmitted by the radio communication system will be subjected to heavy interference. Such a condition may cause the synchronization process to take a very long time, or even become impossible.

Additionally, even radio communication systems that operate in licensed frequency bands can be subjected to undesired interference from time to time. Interference can be reduced using known interference reduction techniques. However, interference with synchronization signals is particularly problematic, because such interference can prevent two nodes from synchronizing, which may preclude the use of the interference reduction techniques.

Note that the risk of interference with synchronization signals may be substantial even if the fraction of radio resources that the interfering system actually uses for transmission is rather small, since modern well-designed radio communication systems tend to have certain similarities in the most fundamental physical-layer design, e.g. concentrating synchronization or other signals to certain frequencies or frequency ranges, or having synchronization signals occur on a regular time grid whose periodicity is easily expressed in SI units, e.g. multiples of 1 ms (cf. the 5 ms interval in LTE).

Some embodiments may increase the efficiency of the synchronization process even in the presence of strong interference, which may lead to reduced setup time for radio connections in some radio transmission environments that are characterized by levels of co-channel interference.

Some embodiments use a hopping pattern for the synchronization signals, so that resources used to transmit synchronization signals change periodically in a predictable manner. The hopping may be in the frequency domain, the time domain, and/or the code domain. In the frequency domain, the node transmitting the synchronization signals may, for example, periodically change the frequency used to transmit the synchronization signals. In some embodiments, the transmitting node may transmit successive synchronization signals using a different frequency every time a synchronization signal is transmitted. In the time domain, each transmission of a synchronization signal may be offset in time (relative to some set of regular nominal time instances) by a varying amount. In this way, it is very unlikely that all synchronization signals will collide with transmissions from the interfering system. The hopping pattern is preferably be predefined, and may be known a priori by the receiver.

Figure 2A:
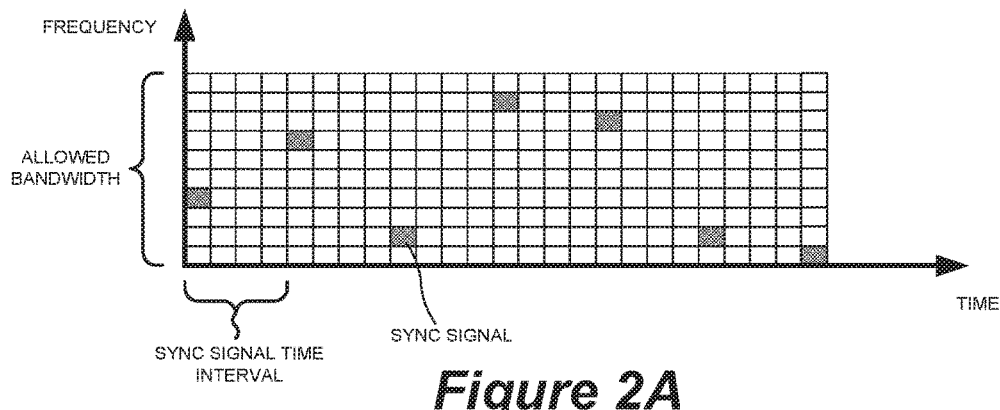
FIGS. 2A to 2C illustrate synchronization signal patterns according to some embodiments in which the frequency of the synchronization signals is changed.

FIG. 2A is a graph showing an example of the use of changing radio resources to transmit synchronization signals. In particular, FIG. 2 is a graph of frequency versus time, in which synchronization signals, or sync signals, are transmitted at regular time intervals, shown in FIG. 1 as the "sync signal interval time." At each sync signal interval, a synchronization signal is transmitted on a frequency that changes from one sync signal interval to the next. The frequency of the sync signal can therefore be said to "hop" around the allowed frequency band. In some embodiments, the hopping pattern may be provided so that the sync signals have an equal probability of falling within each defined frequency in an allowed bandwidth. The frequency hopping pattern may follow a pseudorandom sequence that may or may not have ideal pseudorandom properties. That is, the sequence of frequencies may not satisfy the requirements for an ideal pseudorandom sequence.

It will be appreciated that the radio resources used to transmit synchronization signals may not be changed as each synchronization signal is transmitted. For example, in some embodiments, the radio resources used to transmit synchronization signals may be changed as every other synchronization signal is transmitted, or every third synchronization signal, etc. Using the same resources to transmit successive synchronization signals can assist the receiver in predicting where to find the next synchronization signal. However, there is a trade off in terms of greater susceptibility to interference the longer the same resources are used.

Figure 2B:
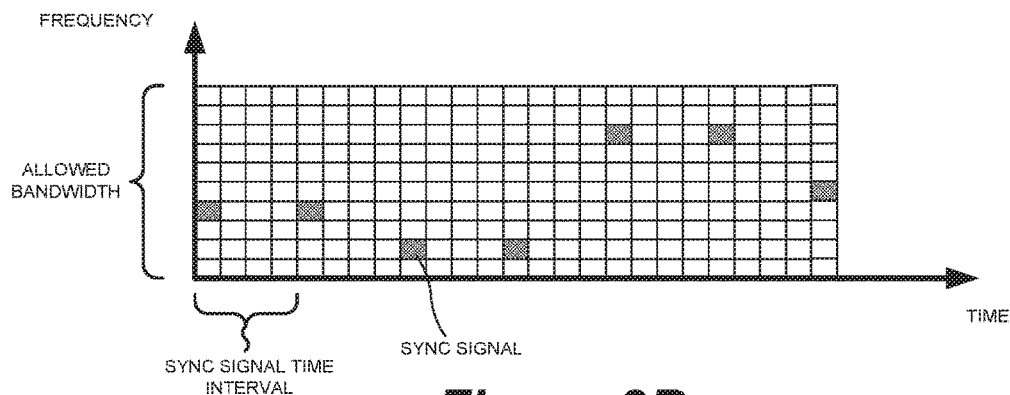

FIG. 2B illustrates an embodiment in which the frequency used to transmit sync signals remains constant for two sync signals and then changes in a predetermined manner.

In some embodiments, a fully pseudo-random hopping pattern may be used, with the type of pseudo-random generator being known to both transmitter and receiver. This approach may reduce the risk of collision on all synchronization signals, but may require the receiver to try an overwhelming amount of hypotheses if it does not know the current state of the pseudo-random number generator. Therefore, in some other embodiments, the hopping pattern may be provided with certain structures or regularities that allow the receiver to dramatically limit the number of hypotheses that have to be tried.

Figure 2C:
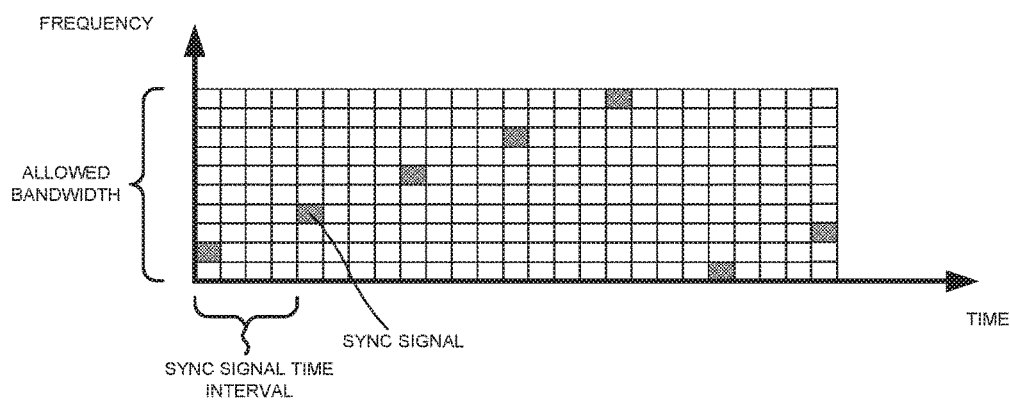

In some embodiments, the sequence may be arithmetically predictable from each synchronization signal. For example, FIG. 2C shows a synchronization signal hopping sequence according to some embodiments, in which the frequency used to transmit the synchronization signal is increased by a regular amount as each successive synchronization signal is transmitted. When the upper boundary of the allowed frequency range is reached, the frequency of transmission is wrapped to a lower boundary of the allowed frequency range. Using a regular arithmetic sequence as illustrated in FIG. 2C may improve the receiver's ability to predict the next successive frequency that will be used to transmit the synchronization signal. However, there may be a tradeoff in terms of interference susceptibility if the successive frequencies are spaced too closely together (i.e., if the frequency offsets from one sync signal to the next are too small).

In the case of pure frequency-domain synchronization signal hopping, the synchronization signals appear regularly spaced in time. For example, in the case of OFDM, regularly spaced OFDM symbols may be used, as discussed above. The frequency or frequencies used for synchronization signals may, however, be different at different time instances.

The set of frequencies used at time instance $t_n$ may be denoted as $F_n \equiv \{f_n^{(k)}\}_{k \in Z^+} = \{f_n^{(0)}, f_n^{(1)}, f_n^{(2)}, \ldots\}$, where $Z^+$ denotes the set of non-negative integers, $n=0, 1, 2, \ldots$ is a time index and $k=0, 1, 2, \ldots$ is a frequency index.

In some embodiments, the sync signals are transmitted in a set of frequencies $F_n \equiv \{f_n^{(k)}\}_{k \in Z^+}$ with $f_n^{(k)} = f_n + \Delta f_k$, where $\{\Delta f_k\}_{k \in Z^+}$ is a set of predefined frequency offsets (independent of n) and $f_n$ is determined using a pseudo-random number generator. In some embodiments, the number of frequency groups may be limited to a value N, i.e., k spans 0 through N−1, and $f_n^{(k)} = f_n + \Delta f_{(M+k) \bmod N}$, where M is a random offset. The resulting set of frequencies can, for example, correspond to a set of OFDM subcarriers. The pseudo-number generator can, for example, have a uniform distribution over the system bandwidth.

In some embodiments, the frequency offsets $\{\Delta f_k\}_{k \in Z^+}$ are all equal (independent of k). In some embodiments, the frequency offsets $\{\Delta f_k\}_{k \in Z^+}$ are additionally limited such that $\{f_n^{(k)}\}_{k \in Z^+}$ are contiguous subcarriers in an OFDM system. Thus, $\Delta f_k = \Delta f$ for all k, where $\Delta f$ is the OFDM subcarrier spacing.

In another embodiment, the set of frequencies $F_n = \{f_n^{(k)}\}_{n \in Z^+}$ may be different for different n, e.g. individually determined by one or more pseudo-random number generators.

In further embodiments, the frequency $f_n$ is not determined by a pseudo-random generator, but rather may be computed as an arithmetic progression. For example, the frequency may be calculated as $f_n = \bmod(f_0 + n \cdot \Delta f, \Delta f_{ref})$, where $\Delta f_{ref}$ is a reference bandwidth, $\bmod(x, y)$ denotes x modulus y, and $\Delta f$ is a predefined frequency interval. In some embodiments, $\Delta f_{ref}$ is set to the system bandwidth. In other embodiments, $\Delta f_{ref}$ is set to the maximum bandwidth that the UE can handle. In some embodiments, $\Delta f$ may be further selected so that it is co-prime to $\Delta f_{ref}$ when expressed in terms of a frequency resource integer index.

In some embodiments, the random-number generator is restarted at regular time intervals. This has the advantage of generating a periodic signal (albeit possibly with long period), which may reduce the number of hypotheses the receiver has to try, thus reducing computational complexity.

In some embodiments, the seed of the pseudorandom number generator may be determined based on the identity of the access node. In some embodiments, the seed may be based on the absolute time. The pseudorandom generator may be a pseudorandom generating function or algorithm.

In one embodiment, only a few values of $f_n$ are used, in order to reduce number of hypotheses the receiver has to evaluate.

Figure 3A:
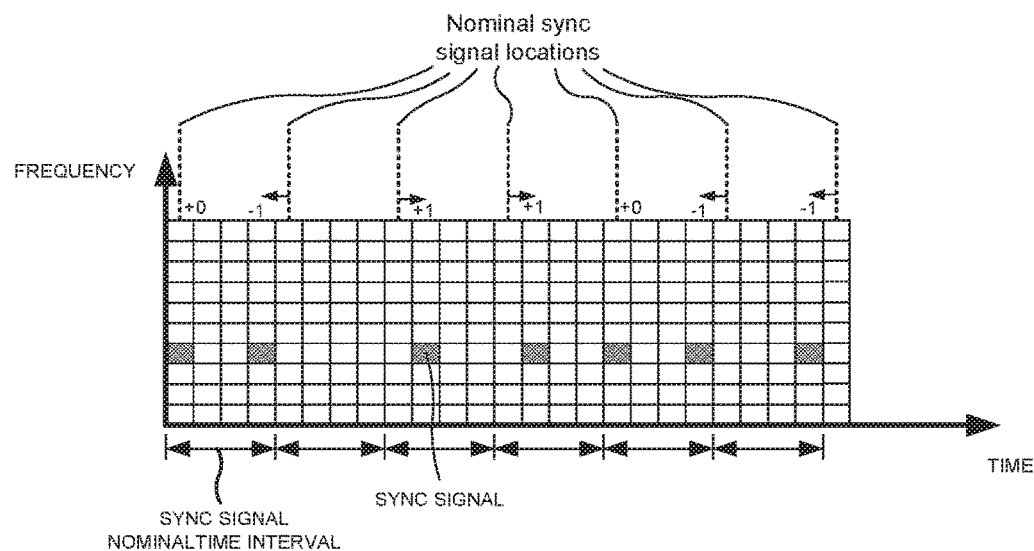
FIGS. 3A and 3B illustrate synchronization signal patterns according to some embodiments in which the time offsets of the synchronization signals is changed.

FIG. 3A illustrates time domain hopping of a synchronization signal. As illustrated in FIG. 3A, each synchronization signal may be transmitted with a varying time offset relative to the pilot grid, e.g. at times $t_n = n \cdot \Delta t + \Delta t_n$, where $n=0, 1, 2, \ldots$, $\Delta t$ is a nominal synchronization time interval, and $\Delta t_n$ is a time offset that is different at different time instances and typically smaller than $\Delta t$. Each $\Delta t_n$ may, e.g., be generated using a pseudo-random number generator. This can be described as a dithering in time domain.

Figure 3B:
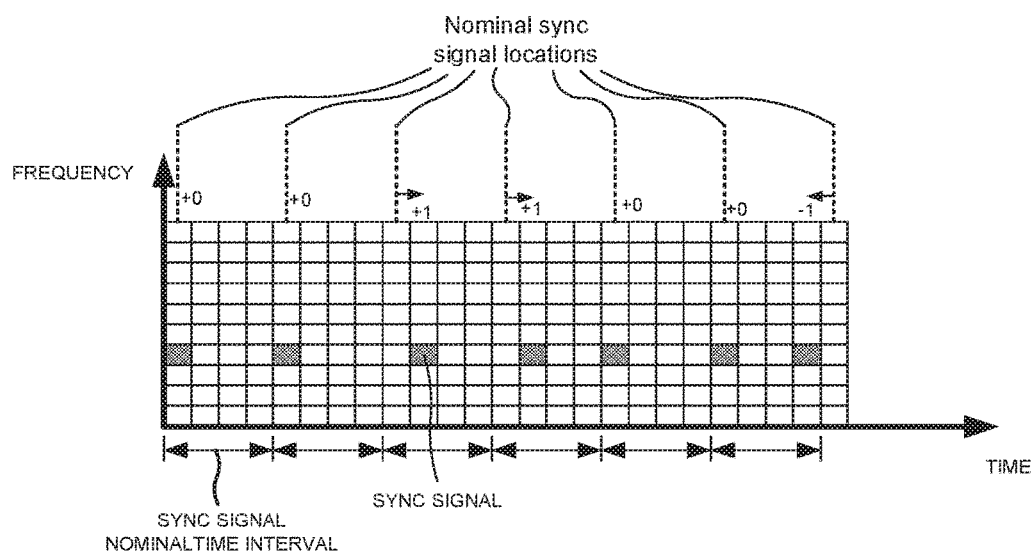

FIG. 3B illustrates time domain hopping of a synchronization signal according to further embodiments. As illustrated in FIG. 3B, pairs of successive synchronization signals may be transmitted with the same time offset relative to the pilot grid, after which the time offset value may change in a pseudorandom or nonrandom manner.

To reduce receiver complexity, predefined subsets of $\Delta t_n$ may be the same, for example, such that each set of M consecutive $\Delta t_n$ have a single value. As a special case, all $\Delta t_n$ may be the same, in which case the value of $\Delta t_n$ may be selected to be incommensurable with $\Delta t$ so that a periodic interferer with short on-intervals has a reduced risk of hitting all pilots.

Hopping in frequency domain and hopping in time domain may be combined, i.e. the time instances $t_n$ and the frequency/frequencies $f_n^{(k)}$ used at those time instances may be determined using one or more of the methods described above.

In addition, beam-forming of pilot signals can be combined with any of the hopping methods described above. In particular, different pilot resources may be beam-formed in different directions at the receiver, either according to a pattern that is generated independently of the frequency- and time-domain hopping pattern(s), or according to a pattern that is generated at least partly based on the frequency- and/or time-domain hopping pattern, to provide additional resistance to interference.

Figure 4:
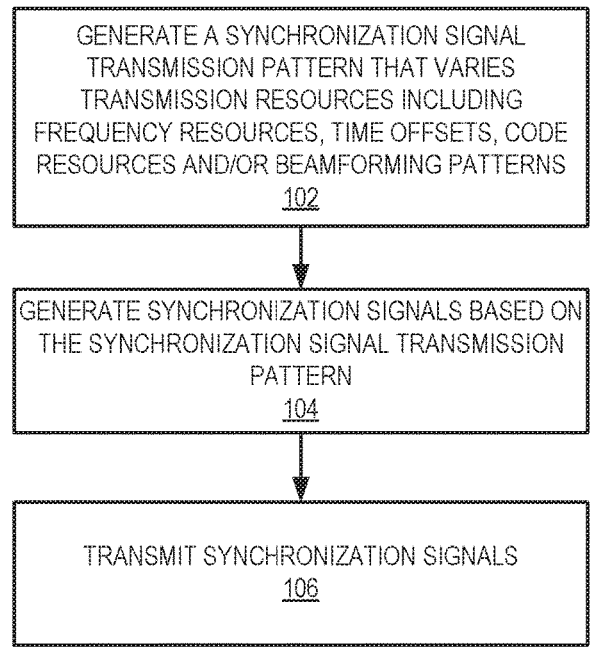
FIGS. 4 to 10 are flowcharts that illustrate operations of a network node that transmits synchronization signals according to various embodiments of the invention.

Operations according to some embodiments are illustrated in FIGS. 4 to 10. Referring to FIG. 4, some operations include generating a synchronization signal transmission pattern (block 102), and generating synchronization signal based on the synchronization signal transmission pattern (block 104). The synchronization signal transmission pattern may vary transmission resources including frequency resources, time offsets, code resources and/or beamforming patterns. The synchronization signals are then transmitted (block 106).

Figure 5:
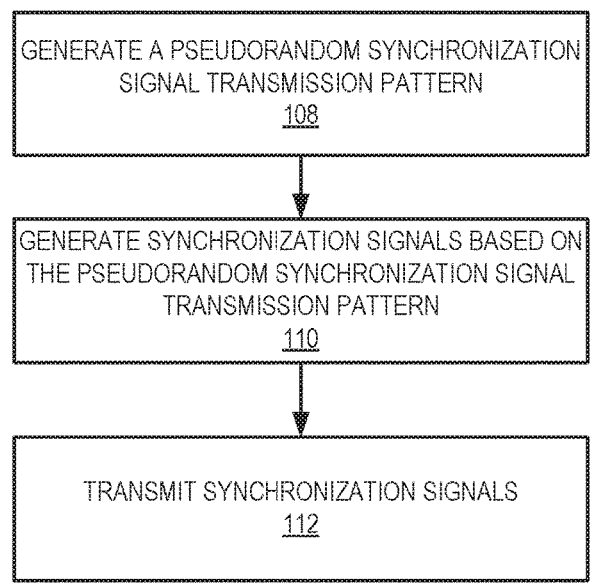

Referring to FIG. 5, operations according to some embodiments include generating a pseudorandom synchronization signal transmission pattern (block 108), and generating synchronization signals based on the pseudorandom synchronization signal transmission pattern (block 110). The synchronization signal transmission pattern may vary transmission resources including frequency resources, time offsets, code resources and/or beamforming patterns in a pseudorandom transmission pattern. The pseudorandom transmission pattern may be generated by a generating function that causes the transmission resources used for transmitting synchronization signals to cover an entire available pool of transmission resources. The transmission resources used for transmitting synchronization signals may cover the entire available pool of transmission resources in a uniform or non-uniform manner. The synchronization signals are then transmitted (block 112).

For example, when the pseudorandom transmission pattern varies the frequency of transmission of synchronization signals, the range of synchronization signals generated by the pattern may cover an entire bandwidth of spectrum available for transmitting synchronization signals. The pseudorandom transmission pattern may vary the frequency of transmission of synchronization signals so that the probability of transmitting a synchronization signal over a given range of frequencies is uniform.

The pseudorandom sequence used to form the pseudorandom transmission pattern may be generated using a generating function and a seed that may be known to both the transmitter and the receiver. The receiver may listen for synchronization signals and, when they are detected, determine the identity of the generating function and the seed in response to the received synchronization signals. In some embodiments, the receiver may form a set of hypotheses based on a set of received synchronization signals, and the set of hypotheses may be narrowed down as more synchronization signals are received until the receiver can uniquely identify the generating function and seed used to form the pseudorandom transmission pattern.

Figure 6:
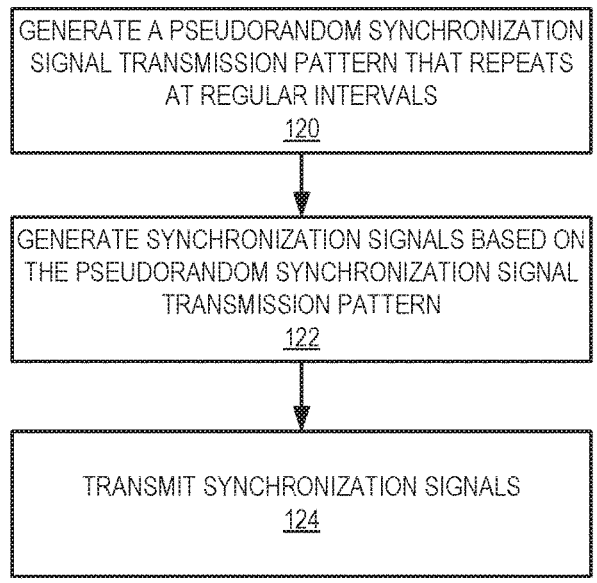

Referring to FIG. 6, in some embodiments, the systems/methods may generate a pseudorandom synchronization signal transmission pattern that repeats at regular intervals (block 120), and then generate synchronization signals based on the pseudorandom synchronization signal transmission pattern (block 122). The synchronization signals are then transmitted (block 124).

Figure 7:
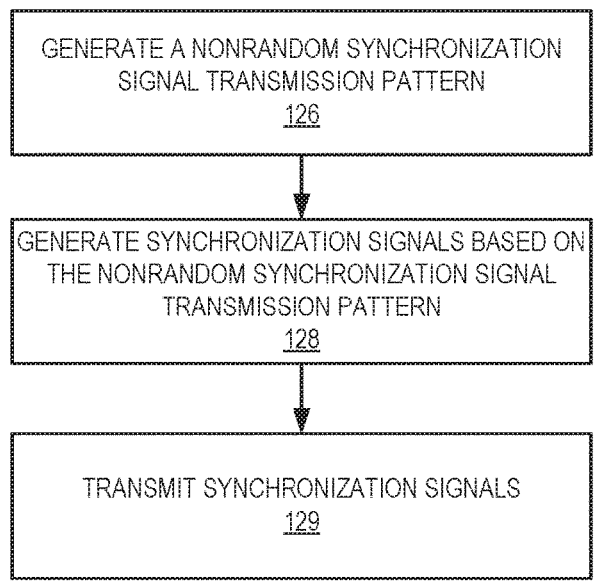

Referring to FIG. 7, systems/methods according to further embodiments may generate a nonrandom synchronization signal transmission pattern (block 126) and then generate synchronization signals based on the nonrandom synchronization signal transmission pattern (block 128). The nonrandom synchronization signal transmission pattern may be determined by an arithmetic formula that does not generate results that approximate a random number, and/or that do not require a random number generator or seed to reproduce. In another aspect, a nonrandom synchronization signal transmission pattern means that the transmission resource of a second synchronization signal can be uniquely determined from a transmission resource of a first synchronization signal preceding the second synchronization signal. The synchronization signals are then transmitted (block 129).

Figure 8:
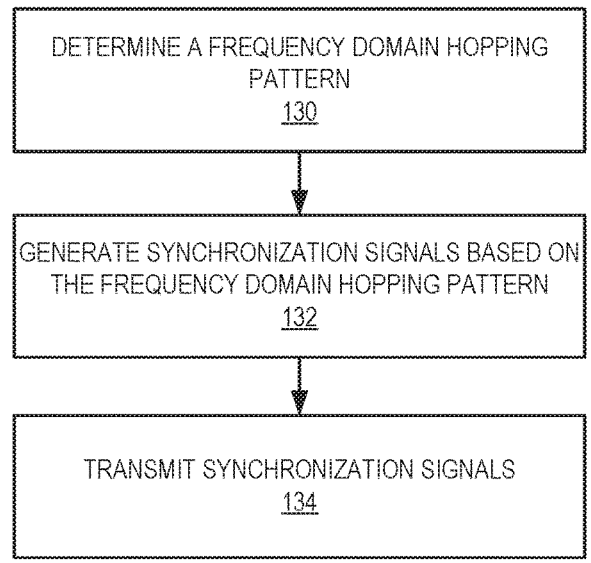

Referring now to FIG. 8, systems/methods according to some embodiments may determine a frequency domain hopping pattern (block 130), generate synchronization signals based on the frequency domain hopping pattern (block 132), and transmit the synchronization signals (block 134).

Figure 9:
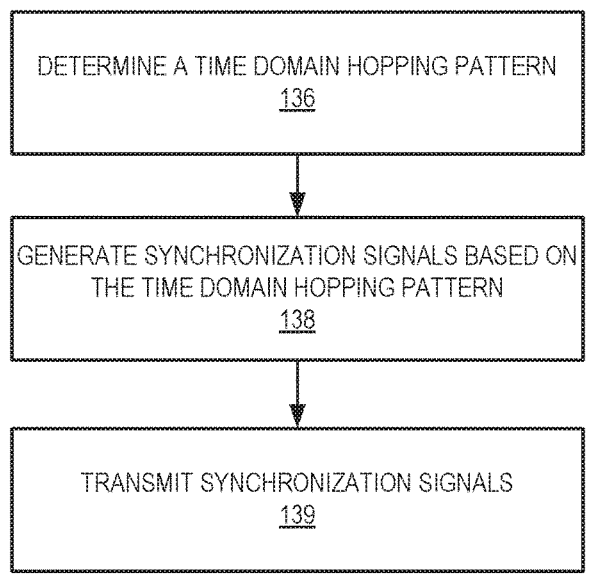

Referring to FIG. 9, systems/methods according to some embodiments may determine a time domain hopping pattern (block 136), generate synchronization signals based on the time domain hopping pattern (block 138), and transmit the synchronization signals (block 134).

Figure 10:
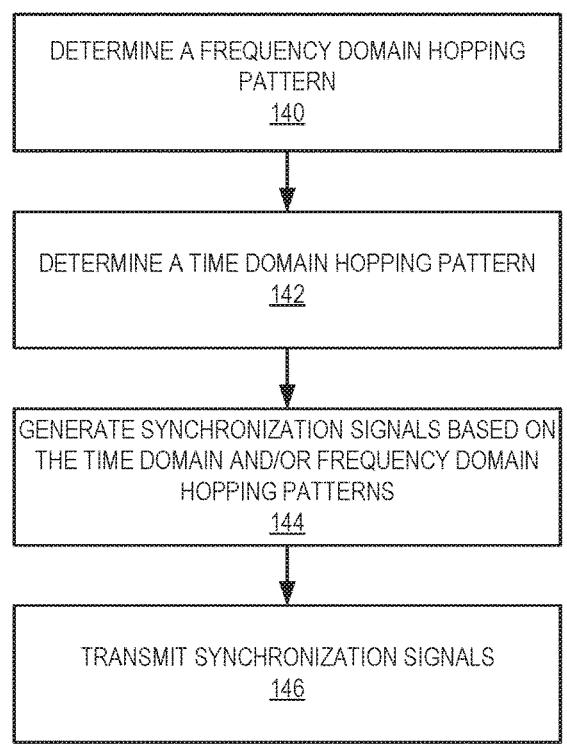

Referring now to FIG. 10, systems/methods according to some embodiments may determine a frequency domain hopping pattern (block 140), determine a time domain hopping pattern (block 142), generate synchronization signals based on the frequency domain hopping pattern and the time domain hopping pattern (block 144), and transmit the synchronization signals (block 146).

Although not illustrated in the figures, systems/methods according to some embodiments may determine a code domain hopping pattern and generate synchronization signals based on the code domain hopping pattern in addition to or instead of a time domain hopping pattern or a frequency domain hopping pattern.

Figure 11:
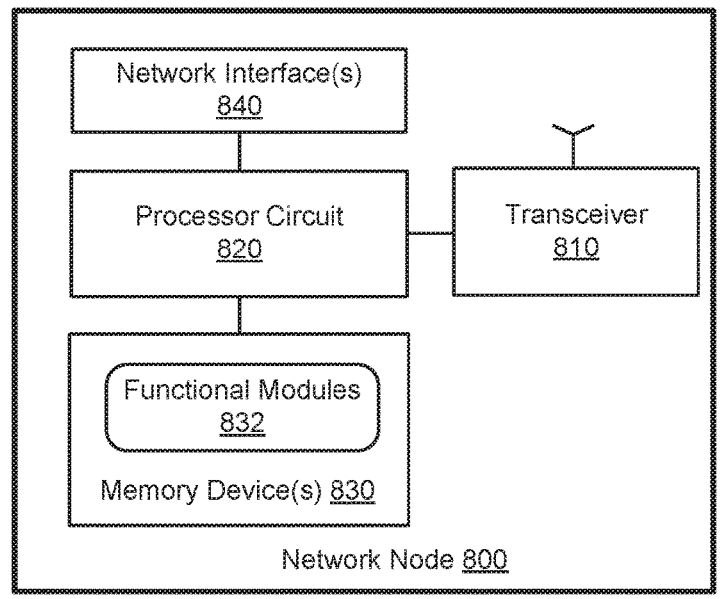
FIG. 11 is a block diagram of a network node according to some embodiments.

FIG. 11 is a block diagram of a network node 800 that is configured according to one or more embodiments disclosed herein for a radio network node, an access node, or other network node. The network node 800 can include a transceiver 810, a network interface(s) 840, a processor circuit(s) 820 (referred to as processor for brevity), and a memory device(s) 830 (referred to as memory for brevity) containing functional modules 832.

The transceiver 810 is configured to communicate with the UE 100 using one or more of the radio access technologies disclosed herein, when the network node 800 is a radio network node. The processor 820 may include one or more data processing circuits, such as a general purpose and/or special purpose processor, e.g., microprocessor and/or digital signal processor, that may be collocated or distributed across one or more networks. The processor 820 is configured to execute computer program instructions from the functional modules 832 of the memory device(s) 830 to perform at least some of the operations and methods of described herein as being performed by a network node. The network interface 840 communicates with other network nodes and/or a core network.

Figure 12:
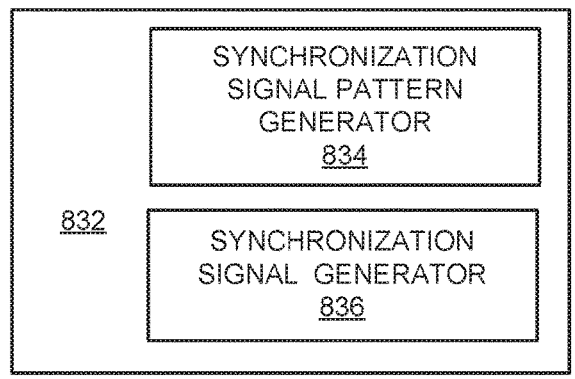
FIG. 12 is a block diagram that illustrates functional modules of a network node according to some embodiments.

FIG. 12 is a block diagram that illustrates the functional modules 832 of the memory 830 in more detail. As shown therein, the functional modules 832 may include a synchronization signal pattern generator 834 and a synchronization signal generator 836. The synchronization signal pattern generator 834 generates a pseudorandom or nonrandom pattern of radio resources that can be used to transmit synchronization signals, and the synchronization signal generator 836 generates synchronization signals in accordance with the pattern. The synchronization signals can then be transmitted by the transceiver 810.

Although illustrated generally as part of the network node 800, it will be appreciated that the synchronization signal pattern generator 834 and/or the synchronization signal generator 836 may be implemented in a different node from the network node that actually transmits the synchronization signals. For example, the synchronization signal pattern generator 834 and/or the synchronization signal generator 836 may be implemented in a scheduling node that provides the synchronization signals to the network node 800 for transmission.

Figure 13:
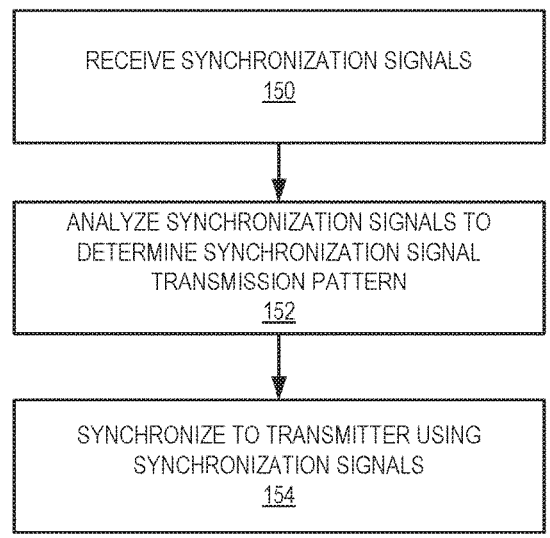
FIGS. 13 and 14 are flowcharts that illustrate operations of a network node that receives synchronization signals according to various embodiments of the invention.
Figure 14:
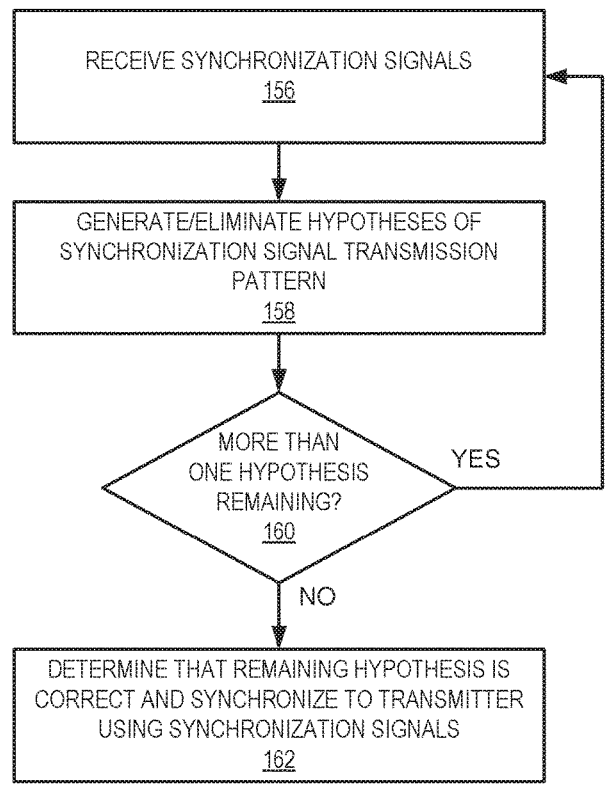

FIGS. 13 and 14 are flowcharts that illustrate operations of a network node such as a UE that receives synchronization signals according to various embodiments of the invention.

Referring to FIG. 13, a network node, such as a UE, may receive one or more synchronization signals (block 150). The node may analyze the received synchronization signals to determine the synchronization signal transmission pattern. For example, the node may analyze the received synchronization signals to determine the sequence generator used to generate the synchronization signal transmission pattern. In some embodiments, the node may analyze the received synchronization signals to determine the identity of a pseudorandom sequence generating function and/or seed used to generate the synchronization signal transmission pattern. Once the node determines the synchronization signal transmission pattern, the node proceeds to receive synchronization signals according to the determined synchronization signal pattern (block 154).

Referring to FIG. 14, the node may receive one or more synchronization signals (block 156). Based on the received synchronization signals, the node may generate a set of one or more hypotheses of the synchronization signal transmission pattern, or eliminate previous hypotheses that are determined to be invalid based on the received synchronization signals (block 158). The node may then determine if there is more than one plausible hypothesis remaining (block 160), and if so, operations return to block 156 and the node receives at least one more synchronization signal. If only one plausible hypothesis remains at block 160, then it is considered that the remaining synchronization signal pattern hypothesis corresponds to the synchronization signal pattern being used by the transmitter, and the node proceeds to receive synchronization signals according to the determined synchronization signal pattern (block 162) so that the node becomes synchronized to the transmitter.

Figure 15:
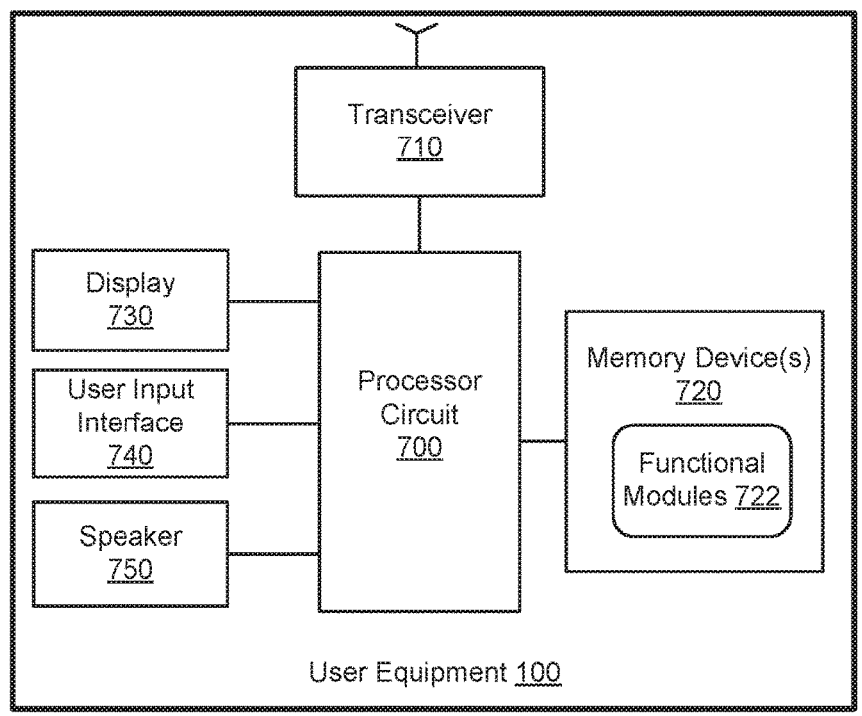
FIG. 15 is a block diagram of a user equipment unit according to some embodiments.

FIG. 15 is a block diagram of a UE 100 that is configured to perform operations according to one or more embodiments disclosed herein. The UE 100 includes a transceiver(s) 710, a processor circuit(s) 700 (referred to as processor for brevity), and a memory device(s) 720 (referred to as memory for brevity) containing functional modules 722. The UE 100 may further include a display 730, a user input interface 740, and a speaker 750.

The transceiver 710 is configured to communicate with a network node through a wireless air interface using one or more of the radio access technologies disclosed herein. The processor 700 may include one or more data processing circuits, such as a general purpose and/or special purpose processor, e.g., microprocessor and/or digital signal processor. The processor 700 is configured to execute computer program instructions from the functional modules 722 of the memory 720 to perform at least some of the operations described herein as being performed by a UE.

Figure 16:
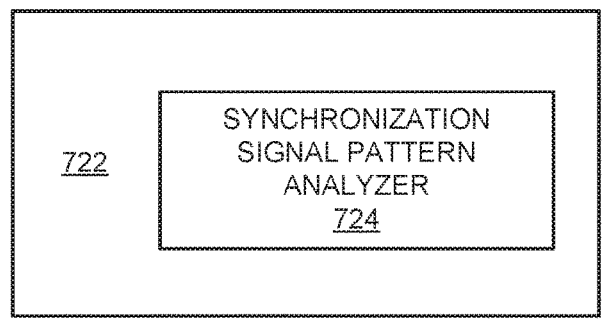
FIG. 16 is a block diagram that illustrates functional modules of a user equipment unit according to some embodiments.

FIG. 16 is a block diagram that illustrates the functional modules 722 of the memory 720 in more detail. As shown therein, the functional modules 722 may include a synchronization signal pattern analyzer 724 that analyzes synchronization signals received by the UE 100 and predicts what resources will be used to transmit a succeeding synchronization signal. Upon detecting a synchronization signal, the processor circuit 700 may inform the synchronization signal pattern analyzer 724 of the radio resources (timeslot, frequency, spreading code, subcarrier, etc.) that were used to transmit the synchronization signal. Based on this information and utilizing knowledge of the synchronization signal patterns that may be used by the network node, the synchronization signal pattern analyzer 724 may formulate one or more hypotheses of what resources will be used to transmit the next synchronization signal. The hypotheses may be communicated to the processor circuit 700, which uses the hypotheses to narrow its search for the next synchronization signal. This process may be repeated as each successive synchronization signal is received until the synchronization signal pattern is determined unambiguously.

ABBREVIATIONS

UE User Equipment
AN Access node
TDD Time division duplexing
FDD Frequency division duplexing
PSS Primary synchronization signal
SSS Secondary synchronization signal
OFDM Orthogonal frequency division multiplexing
TDM Time division multiplexing
FDM Frequency division multiplexing
CDM Code division multiplexing
3GPP Third generation partnership project
LTE Long-Term Evolution (3GPP standard)
E-UTRA Evolved Universal Terrestrial Radio Access It will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of synchronizing transmission of signals from a network node to a receiver, the method comprising:
generating a synchronization signal transmission pattern in which transmission resources used for transmission of synchronization signals in regularly spaced time intervals are changed periodically, wherein the synchronization signal transmission pattern comprises a pseudorandom pattern, wherein the synchronization signal transmission pattern defines a pattern of transmission frequencies, and wherein the pseudorandom pattern has a predefined distribution over a predefined transmission bandwidth; and
transmitting the synchronization signals from the network node in accordance with the synchronization signal transmission pattern.

2. The method of claim 1, wherein generating the synchronization signal transmission pattern comprises defining a pattern of frequency resources, time offsets relative to the regularly spaced time intervals, spreading codes, and/or beamforming patterns.

3. The method of claim 1, wherein the pseudorandom pattern repeats at regular intervals.

4. The method of claim 1, wherein the pseudorandom pattern has a uniform distribution over the predefined transmission bandwidth.

5. The method of claim 1, wherein transmitting the synchronization signals comprises controlling frequency and time offsets of successive transmissions of the synchronization signals, according to the synchronization signal transmission pattern.

6. The method of claim 1, wherein the synchronization signal transmission pattern comprises a nonrandom pattern using which a transmission resource of a second synchronization signal can be uniquely determined from a transmission resource of a first synchronization signal preceding the second synchronization signal.

7. The method of claim 1, wherein the pattern of transmission frequencies corresponds to subcarrier frequencies in an orthogonal frequency division multiplexing (OFDM) communication system.

8. The method of claim 1, wherein the transmission resources comprise transmission frequencies $F_n \equiv \{f_n^{(k)}\}_{k \in Z^+}$ with $f_n^{(k)} = f_n + \Delta f_k$, wherein $\{\Delta f_k\}_{k \in Z^+}$ is a set of predefined frequency offsets, and wherein $Z^+$ denotes the set of non-negative integers, n=0, 1, 2 . . . is a time index, and k=0, 1, 2 . . . is a frequency index.

9. The method of claim 8, wherein the transmission frequencies $f_n^{(k)}$ are determined using a pseudorandom number generator.

10. The method of claim 8, wherein the set of predefined frequency offsets $\{\Delta f_k\}_{k \in Z^+}$ are limited such that $\{f_n^{(k)}\}_{k \in Z^+}$ are contiguous subcarriers in an orthogonal frequency division multiplexing (OFDM) communication system.

11. The method of claim 8, wherein $f_n$ is determined as $f_n = \mathrm{mod}(f_0 + n \cdot \Delta f, \Delta f_{ref})$, where $\Delta f_{ref}$ is a reference bandwidth, mod(x, y) denotes x modulus y, and $\Delta f$ is a predefined frequency interval.

12. The method of claim 11, wherein the reference bandwidth $\Delta f_{ref}$ is set to a maximum bandwidth that a receiving node can process.

13. The method of claim 11, wherein the predefined frequency interval $\Delta f$ is selected so that it is co-prime to the reference bandwidth $\Delta f_{ref}$.

14. The method of claim 1, wherein the transmission resources remain constant for a predetermined number of time intervals before changing.

15. A network node, comprising:
a processor circuit;
a transceiver coupled to the processor circuit; and
a memory device coupled to the processor circuit,
wherein the memory device comprises:
a synchronization signal pattern generator that generates a synchronization signal transmission pattern in which transmission resources used for transmission of synchronization signals in regularly spaced time intervals are changed periodically; and
a synchronization signal generator that generates the synchronization signals in accordance with the synchronization signal transmission pattern, wherein the synchronization signal transmission pattern comprises a pseudorandom pattern, wherein the synchronization signal transmission pattern defines a pattern of transmission frequencies, wherein the pseudorandom pattern has a predefined distribution over a predefined transmission bandwidth, and
wherein the processor circuit causes the transceiver to transmit the synchronization signals in accordance with the synchronization signal transmission pattern.

16. A user equipment node, comprising:
a processor circuit;
a transceiver coupled to the processor circuit; and
a memory device coupled to the processor circuit,
wherein the memory device comprises a synchronization signal pattern analyzer that analyzes synchronization signals received by the transceiver and identifies a transmission pattern of the synchronization signals in which transmission resources used for transmission of the synchronization signals in regularly spaced time intervals are changed periodically, wherein the transmission pattern of the synchronization signals comprises a pseudorandom pattern, wherein the transmission pattern of the synchronization signals defines a pattern of transmission frequencies, wherein the pseudorandom pattern has a predefined distribution over a predefined transmission bandwidth, and
wherein the processor circuit causes the transceiver to receive the synchronization signals in accordance with the transmission pattern of the synchronization signals and to generate a plurality of hypotheses of a synchronization signal pattern based on transmission resources used for transmission of one of the synchronization signals.

17. A method of operating a user equipment node that interacts with a network node, the method comprising:
receiving synchronization signals from the network node;
analyzing the synchronization signals to identify a transmission pattern of the synchronization signals in which transmission resources used for transmission of the synchronization signals in regularly spaced time intervals are changed periodically; and
receiving the synchronization signals in accordance with the transmission pattern of the synchronization signals, wherein the transmission pattern of the synchronization signals comprises a pseudorandom pattern, wherein the transmission pattern of the synchronization signals defines a pattern of transmission frequencies, wherein the pseudorandom pattern has a predefined distribution over a predefined transmission bandwidth, and wherein the identification of the transmission pattern of the synchronization signals comprises generating a plurality of hypotheses of a synchronization signal pattern, based on transmission resources used for transmission of a first synchronization signal of the synchronization signals.

18. The method of claim 17, wherein the identification of the transmission pattern of the synchronization signals further comprises eliminating at least one hypothesis of the plurality of hypotheses of the synchronization signal pattern based on transmission resources used for transmission of a second synchronization signal of the synchronization signals.

19. The method of claim 18, further comprising:

after eliminating the at least one hypothesis of the synchronization signal pattern, determining if more than one hypothesis of the synchronization signal pattern remains, and if so, receiving another synchronization signal.

20. The method of claim 18, further comprising:

after eliminating the at least one hypothesis of the synchronization signal pattern, determining if more than one hypothesis of the synchronization signal pattern remains, and if only one hypothesis of the synchronization signal pattern remains, determining that the synchronization signal pattern corresponds to the remaining synchronization signal pattern hypothesis; and synchronizing the user equipment node to the network node using the synchronization signal pattern.

* * * * *